March 24, 1936.  A. HUGUENIN  2,034,815
RAILWAY VEHICLE BRAKE
Filed Oct. 12, 1934  2 Sheets-Sheet 1
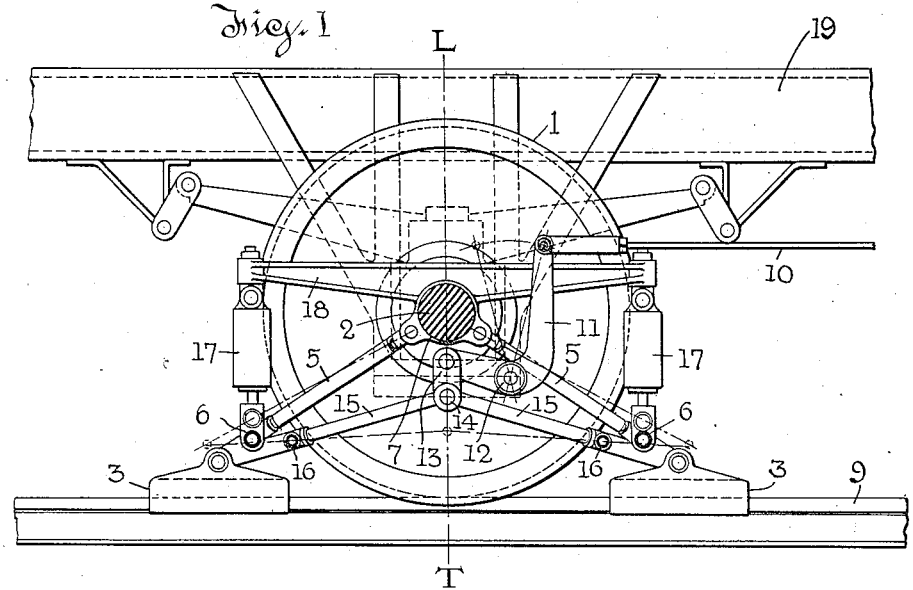
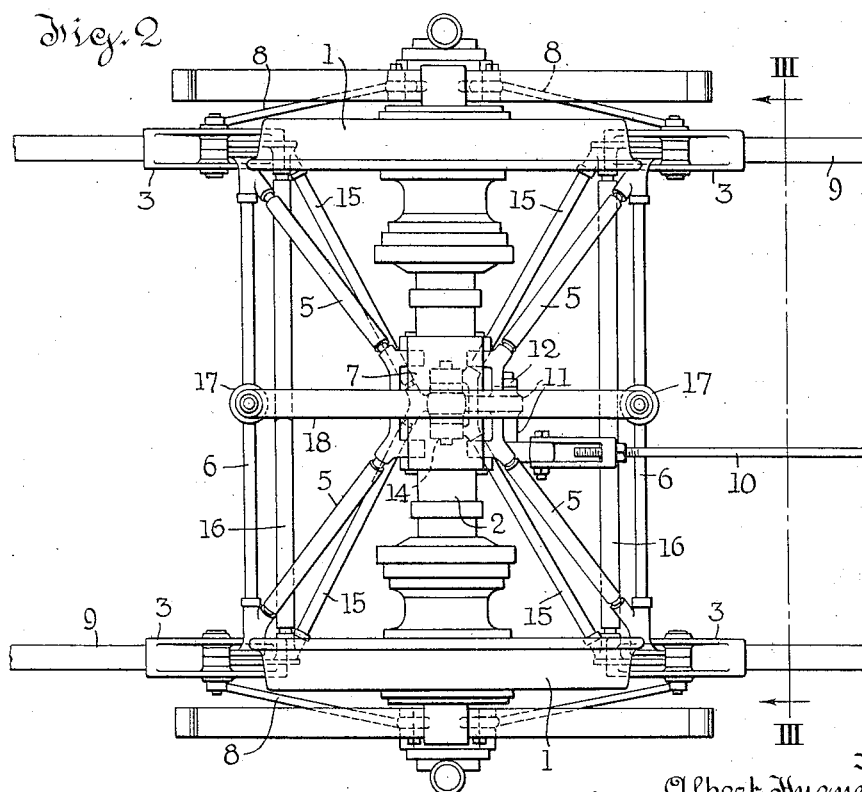
Inventor
Albert Huguenin
Attorneys March 24, 1936.  A. HUGUENIN  2,034,815
RAILWAY VEHICLE BRAKE
Filed Oct. 12, 1934  2 Sheets-Sheet 2

Inventor
Albert Huguenin
By Dodge and Sons
Attorneys

Patented Mar. 24, 1936

2,034,815

UNITED STATES PATENT OFFICE 2,034,815

RAILWAY VEHICLE BRAKE

Albert Huguenin, Zurich, Switzerland

Application October 12, 1934, Serial No. 748,106
In Switzerland October 12, 1933

12 Claims. (Cl. 188—41)

This invention relates to railway brakes, and particularly to so-called track brakes, that is, brakes in which the brake blocks or shoes contact, not with the wheels, but with the rails.

It is well understood in the art that brakes of this type have decided advantages, particularly where high deceleration rates are desired. In such brakes as heretofore constructed, there has been the characteristic disadvantage that the force ratio between the brake rigging and the brake blocks is too great, with the result that such brake systems have been characterized by unduly harsh stops. One purpose of the present invention is to insure a smooth and satisfactory braking action.

To this end the invention involves the use of brake blocks which are guided and supported against the braking stress by rods arranged to form frames, one in advance of and the other behind the wheels. Such frames are arranged symmetrically with reference to the load transfer point between the car frame and the wheels, and the brake blocks or shoes project in the direction of the rails considerably beyond the wheels.

The term "load transfer point" is intended to indicate generally the point or line through which the load carried by the frame is transferred to the wheel or wheels. Where a single axle is used at each end of the car, as indicated in the drawings, this is a vertical line through the center of the axle. Where a bogie truck is used, this is a vertical line through the center bearing or king pin of the truck. Both arrangements are well known in the art, but the first is illustrated in the drawings, because in that way a very simple disclosure becomes possible. The same principles are, however, applicable to multi-wheel bogie trucks, as will readily be understood.

The frame members which support the brake blocks are so arranged that they make a relatively small angle with the pull rods or frames which are pivoted to the brake block and serve to transmit the braking stress thereto. The effect of this is to limit the braking pressure exerted between the brake blocks and the rail, with the result that smooth braking is secured.

The invention will now be described with reference to the accompanying drawings which are intended to be illustrative and not limiting and in which:—

Fig. 1 is a side view of a portion of the under frame of a railway car showing one pair of supporting wheels with related structure, as well as the track brake arrangement associated with such wheels;

Fig. 2 is a plan view of the structure shown in Fig. 1;

The flanged car wheels 1 are mounted on axles 2, only one such axle being shown. The wheels 1 are indicated as mounted rotatably on the axle 2, which, in that case, becomes a shaft, but it is immaterial to the invention whether the axles are so mounted or are fixed on the wheel, which, in the latter case, rotates in journal boxes, according to the practice universally used in the United States.

Figure 3:
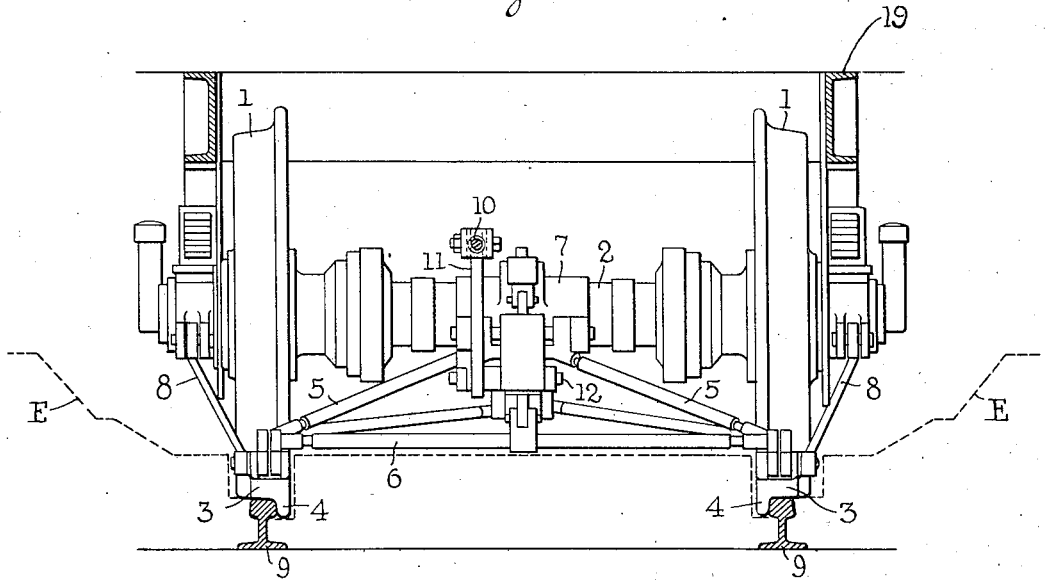
Fig 3 is a section on the line III—III of Fig. 2, looking in the direction of the arrows.

Rail brake shoes or brake blocks 3 are provided, there being one in front of and to the rear of each wheel 1. These blocks are positioned symmetrically with reference to the load transfer point above defined, and here indicated by the vertical line LT. The brake blocks 3 are flanged, as indicated at 4, and the contour of the blocks will correspond suitably to the form of the rail head, or it may approximate the contour of the wheel rim, that being a matter of design with which the present invention is not concerned. For purposes of description the car frame, partially shown in Figures 1 and 3, is designated generally by the reference character 19.

The brake blocks are guided by a frame preferably constructed of tubing, there being one such frame for the pair of brake blocks in advance of the wheel, and a similar frame for the pair of brake blocks at the rear of the wheel. Such frames comprise main rods 5 and transverse struts 6, each such frame being pivotally connected to a box or housing 7 which surrounds and is carried by the wheel at the midlength thereof (see Fig. 2). If the axle is fixed, this box may be fast thereon, but, if the axle rotates with the wheels, some provision must be made to permit this rotation to occur and still insure proper support of the box. The essential function of the box however supported is to offer fulcra for the frames just described. It is not even necessary that such supporting box be sustained on the axle; but that is the convenient way to mount it in cases where the axle and the load transfer line LT intersect. Of course, they would not intersect in the case of a four-wheel bogie truck. Consequently, no necessary limitation to the mounting of the box 7 on the axle is implied.

The ends of the frame members 5 remote from the box 7 extend in the general direction of the rails 9, when viewed in side elevation (Fig. 1), considerably beyond the wheels. Auxiliary rods 8 serve as radius rods to guide the individual brake blocks 3 and these rods are supported on the axles or axle boxes, depending on whether the axle is fixed or rotary. Their pivot points are coaxial with the pivots upon which the frame members 5 are connected to the box 7 or its equivalent.

A lever system is provided for mechanically forcing the four brake blocks 3 against the rails 9. This lever system is actuated by a single element which takes the form of a pull rod 10. The pull rod 10 is pivotally connected to the upper end of the vertical arm of a bell-crank lever 11 mounted on a fixed fulcrum at 12 on box 7. To the shorter and substantially horizontal arm of the bell-crank lever 11 is connected a pendant link 13. The lower end of this link 13 is pivoted at 14 to the ends of four rods 15, each of which is pivoted at its other end to one of the brake blocks 3. The rods 15 are preferably connected in pairs by struts 16 which, with the rods, form what is in effect a triangular frame.

To assist in sustaining the brake blocks and their associated frames in release position, two tension spring elements 17 are provided. These are carried by a horizontal yoke 18 supported by the box 7, and are attached at their lower ends to the struts 6 which form portions of the first-mentioned triangular frame.

The parts are so arranged that the angle $a$ (see Fig. 4) between the first-named frame, made of the elements 5 and 6, and the second-named frame, made up of the elements 15 and 16, is quite small, and this angle becomes smaller as the brake blocks are moved in a brake-applying direction.

Figure 4:
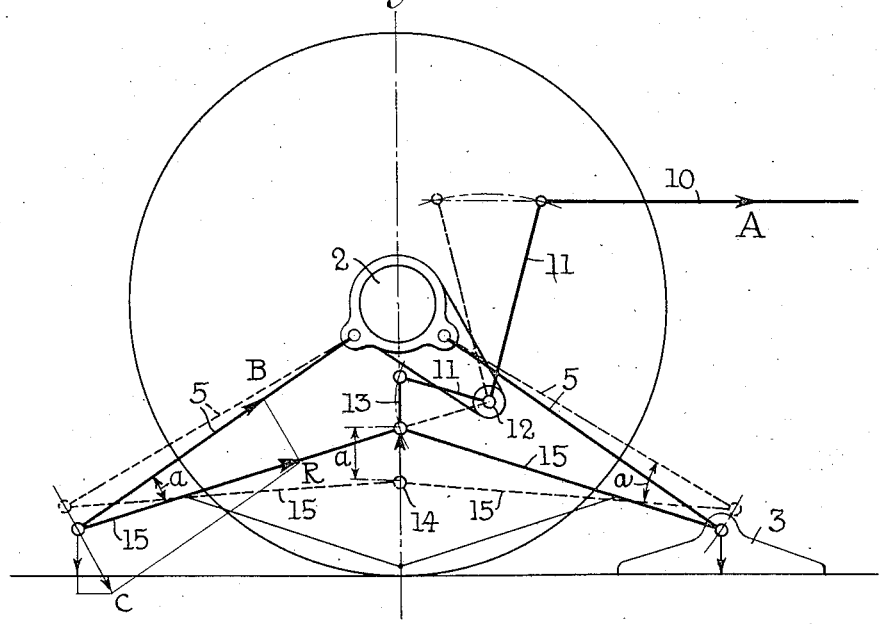
Fig 4 is a line diagram of the brake rigging shown in Figs. 1-3, inclusive, the brake applying position being shown in full lines and the release position being shown in dotted lines. The forces are indicated by vector diagrams associated with the full line position.

In Fig. 4 are shown diagrammatically in a simplified form, and in two different positions, the main suspension rods 5 which are associated with the front and rear brake blocks 3, as well as the members 10, 11, 12, 13, 14, and 15 of the brake gear or linkage for actuating these brake blocks 3. The position indicated in broken lines corresponds to the position of these parts with the brake blocks raised, while their position with the brake applied is shown in full lines. A force A (Fig. 4) applied to the main brake rod 10 is used for applying the brake blocks. This corresponds to the resultant R of the force B corresponding to the weight of the car, and the mechanical force C to be applied to the blocks 3. A large amount of lost motion of the brake gear is required in order to secure simultaneous operation of all the brake blocks in the case of long trains. However, slack in the braking action throughout the entire length of the train cannot be avoided. The brake gears now in use also show this characteristic.

Where long travel of the brake blocks is provided, it is easier for the personnel to determine the proper operation of the system during brake tests. The novel brake system affords important advantages over those used at the present as regards this important operating desideratum.

Due to the fact that in the arrangement described, the angle $a$ between each main suspension rod 5 and the corresponding rod 15 of the brake gear is relatively small, and becomes even smaller when the brake blocks are applied to the rails, the force C for applying the brake blocks 3 becomes small despite the weight of the car (force B). The fact that the mechanical application of the blocks 3 against the rails 9 takes place with a relatively small braking effort is of the utmost importance, because, in such a case, there is secured an adjustable shock-free braking action. Due to the large friction surfaces between the four blocks 3, which are provided for each pair of wheels, and the rails 9, there is secured a very strong braking action. It is clear that all danger of derailment is avoided, the flanges 4 on the brake blocks 3 preventing this most effectively. The relatively small angle $a$ produces the additional advantage that, when the brake gear is actuated to apply the brake blocks to the rails, the pin 14 has to be displaced in a vertical direction a relatively small distance only. This facilitates considerably the meeting of the additional requirements that no part of the brake system should ever extend beyond the bounding edge of the normal profile E (Fig. 3) of the rolling stock. The considerable overhang of the brake blocks 3 in the direction of the rails also results in a great length of brake gear and, hence, in a great inherent elasticity of the latter, so that this brake gear exerts per se an appreciable smoothing influence on the braking action.

While I have shown two sets of brake shoes, one in advance of and the other in rear of the wheels, the same principle may be applied with only one set of brake shoes which, in that event, may be in advance of or in rear of the wheel, depending upon the direction of motion of the vehicle. In such case, some means must be provided to guide the pivot 14 in a vertical direction, and any known means to this end might be adopted to take the place of the frame 15, 16 which, in the embodiment shown, performs that function. In the case of four-wheel bogie trucks, the arrangement would be similar to that shown in Fig. 1, except that the load transfer line would pass through the center bearing and the blocks would be located symmetrically with reference thereto. In such case, the box 7 or its equivalent would not be supported by either axle of the truck, but would be suitably supported by other means and located symmetrically with reference to the load transfer line. Pull rod 10 may be actuated manually or by any suitable power brake system, pneumatic or mechanical, the present invention being concerned with the brake rigging, and not with the force developing mechanism as such.

It will be understood that the invention is concerned with the location of the brake shoes relatively to the load transfer line, and not with the specific structure of the wheels which support the vehicle. The idea is that the brake shoes will engage the rails symmetrically with reference to the load transfer point in advance of and behind the supporting wheels, regardless of their number, and the supporting pivots for the frames which guide the brake shoes and the frames through which the braking forces are applied will be accommodated to the particular structure with which they happen to be used, that structure not being a feature of the present invention.

What is claimed is:—

1. A railway vehicle track brake comprising a vehicle frame element supported by wheels engaging the rails of the trackway; an axle for said wheels; a plurality of brake blocks; movable brake gear including two rods pivoted about a common point on each of said blocks and forming an acute angle one with the other at their ends adjacent to said common point and pivotally connected to said axle; and means whereby said gear may be actuated to move said blocks toward and away from said rails.

2. A railway vehicle brake comprising a vehicle frame element supported by wheels engaging the rails of the trackway; an axle connecting said wheels; a box disposed on said axle approximately midway between the ends of said axle; a plurality of brake blocks supported by said box and disposed symmetrically with respect to the load transfer point between said frame element and the wheels, at least two brake blocks being employed in connection with each rail; and mechanical linkage for moving said brake blocks toward or away from said rails.

3. A railway vehicle brake comprising a frame; wheels rotatably mounted with respect to said frame and including an axle; a plurality of pairs of brake blocks depending from said axle into cooperative relation with said rails, each pair of blocks being disposed symmetrically with respect to the load transfer point between said frame and said wheels; supporting linkage pivotally connecting said blocks to said axle; and means whereby said linkage may be moved to elevate or depress said blocks.

4. A railway vehicle brake comprising a pair of wheels; a frame; an axle connecting said wheels to said frame; a plurality of pairs of rail-engaging brake blocks carried by said axle and symmetrically disposed with respect to the load transfer point between said frame and said wheels; supporting linkage between said pairs of blocks and said axle, said linkage comprising a pair of individual rods connected to each block at a common point thereon; and a common actuating lever for moving said pivot along a vertical path to move all of said blocks in concert.

5. A railway vehicle brake comprising a car frame supported on wheels; an axle connecting said wheels; a plurality of pairs of brake blocks depending from said axle, each pair of blocks being symmetrically located with respect to the load transfer point between said car frame and said wheels; linkage arranged in the form of a frame and comprising two rods connecting each of said blocks to said axle and a transverse strut tying the ends of said rods together at points remote from the points of connection of the rods to the axle; a common supporting means on said axle, one rod from each of said blocks being pivotally connected to said means; and a common means for moving a portion of said common supporting means to move said blocks up or down in concert.

6. A railway vehicle brake comprising a car frame having an axle supported by wheels; a brake block disposed in front of and in rear of each of said wheels; a pair of rods connecting each of said blocks to said axle, said rods being attached to a common pivot on said blocks and being separated by an acute angle adjacent said blocks; transverse means for tying together corresponding rods attached to the front and rear blocks; a bell-crank lever pivotally connected to said axle; a common pivot on one end of said bell-crank lever and having one rod from each block connected to it; and a lever for moving said bell crank to move said brake blocks up or down in concert.

7. A railway vehicle brake comprising a car frame; an axle mounted in said frame and having wheels thereon; a pair of brake blocks disposed in line with each wheel and symmetrically located with respect to the axle; a box on said axle; a plurality of main suspension rods each pivoted to said box and to one of said blocks in overhung relation to said axle; a plurality of other rods each connected to a common pivot on said box and to one of said blocks to form a small acute angle with the corresponding main suspension rod adjacent to their point of connection to the block; transverse struts connecting the main rods together and the other rods together; means for biasing the brake blocks to elevated position; and a common means for imparting limited vertical movement to the common pivot on said box to move all of said blocks.

8. In a railway track brake, the combination of a car frame; a wheeled support therefor mounted for limited motion relatively thereto about a load transfer point; a pair of frames mounted on said wheeled support, each swinging on a horizontal axis adjacent said load transfer point, with respect to which said frames are symmetrically arranged; track brake shoes carried by said frames; a pair of frames hinged to each other and to the first-named frames, the second-named frames being approximately alined when said brakes are released; and means for forcing the second-named frames away from said approximately alined position to apply the brakes.

9. The combination defined in claim 8 in which the two sets of frames are hinged together on common axes which pass approximately through the brake shoes.

10. The combination defined in claim 8 in which a yielding device supports each of the first-named frames in brake release position.

11. The combination defined in claim 8 in which the second-named frames are positioned at small angles with the first-named frames at their points of connection when the brakes are released, and such angle diminishes as the parts are shifted to apply the brakes.

12. In a railway vehicle brake, the combination of a car frame; a wheeled support therefor mounted for limited motion relatively thereto about a load transfer point; a supporting box mounted on said axle approximately midway between the ends of said axle; a first pair of frames pivoted to said box; a second pair of frames pivoted to said box; brake blocks supported by said frames at points remote from said axle; and means for forcing related pairs of frames apart to bring the brake blocks into contact with the rails and to bring said frames toward one another to retract the blocks from the rails.

ALBERT HUGUENIN.